Feb. 22, 1944.   N. C. PRICE   2,342,220
PRESSURE CONTROL SYSTEM
Filed June 29, 1940   3 Sheets-Sheet 2
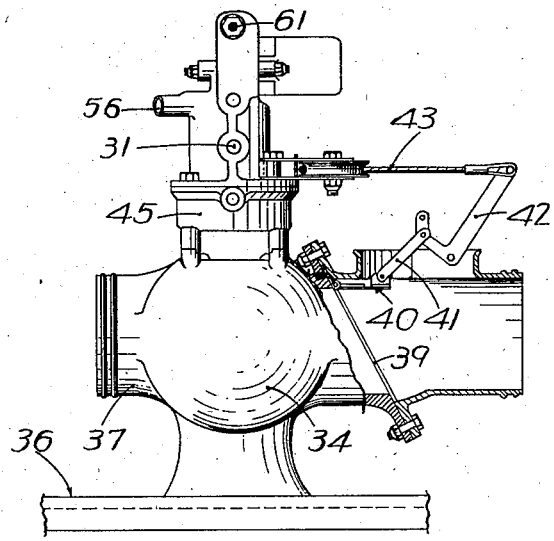
FIG-IV
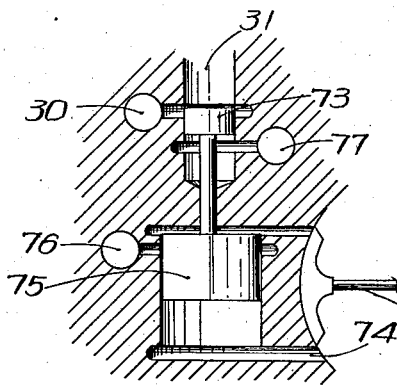
FIG-II
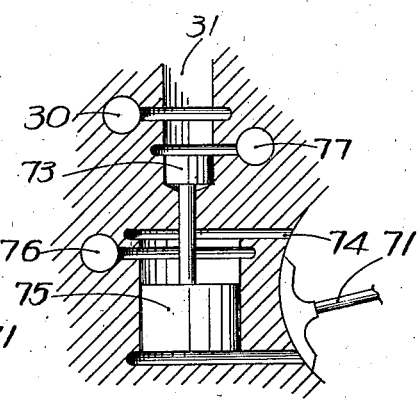
FIG-III
INVENTOR

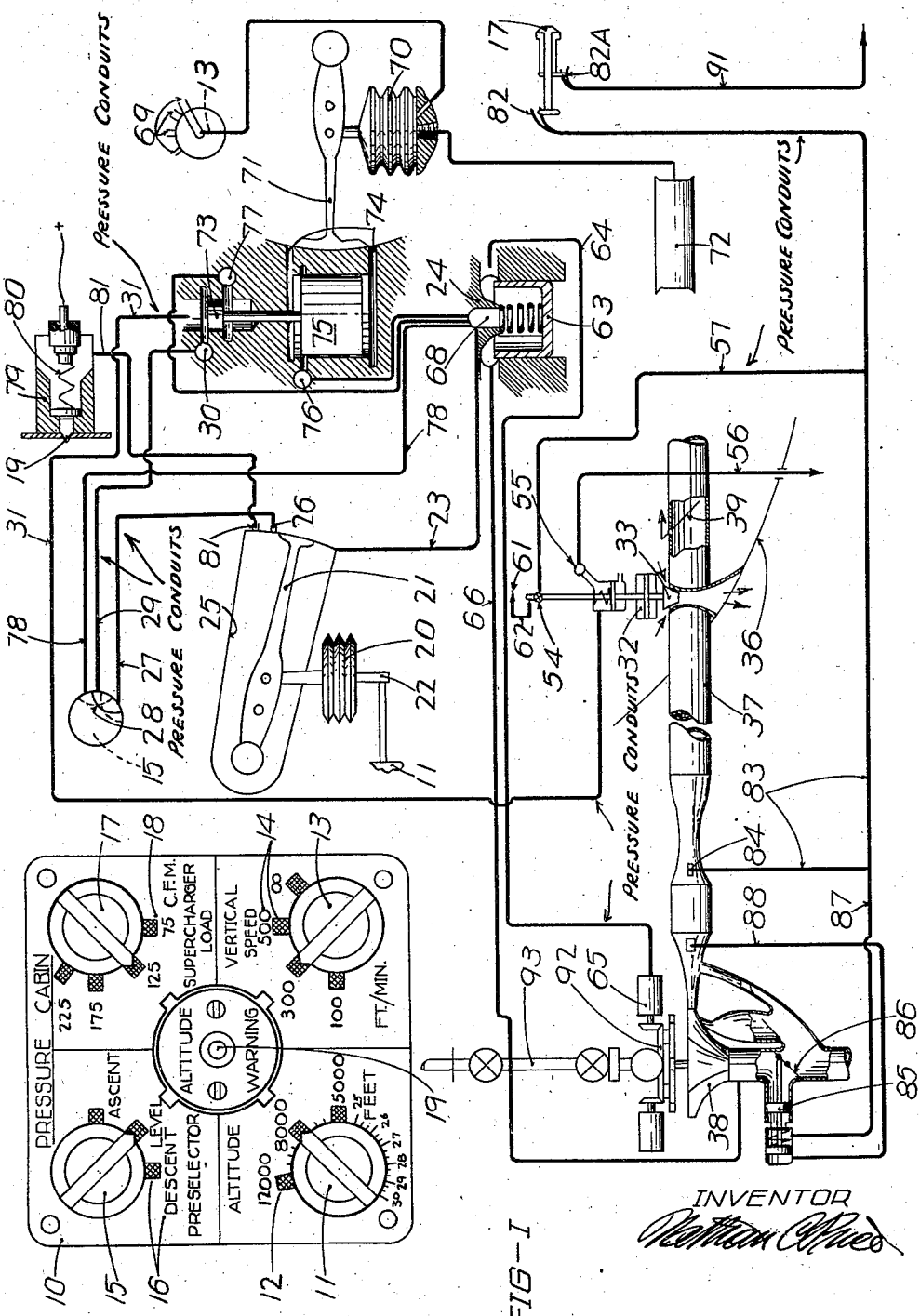

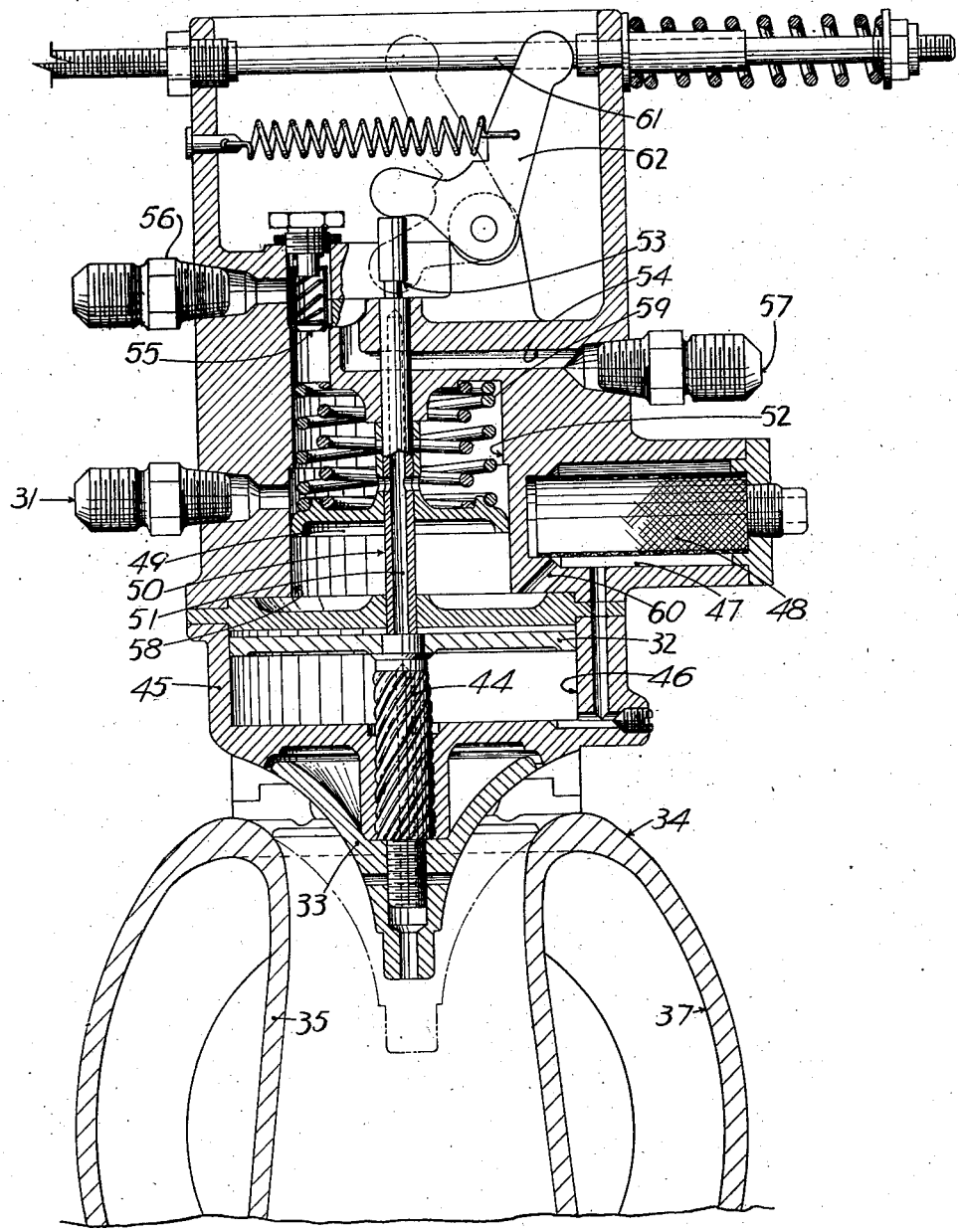
FIG-V

Patented Feb. 22, 1944

2,342,220

UNITED STATES PATENT OFFICE 2,342,220

PRESSURE CONTROL SYSTEM

Nathan C. Price, Los Angeles, Calif., assignor to
Lockheed Aircraft Corporation, Burbank, Calif.

Application June 29, 1940, Serial No. 343,274

27 Claims. (Cl. 98—1.5)

This invention relates to a cabin pressure control system for maintaining a positive pressure in the cabin of aircraft intended for high altitude flight. It is well known that the rarified atmosphere at high altitudes has numerous unfavorable effects on passengers and crew; yet it is desirable to fly at high altitudes both because of increased speed, and avoidance of possible bad weather conditions at lower altitudes.

It is accordingly an object of this invention to provide an improved control adapted to maintain an adjustable positive pressure within the cabin, limited to a safe maximum determined by the structural or bursting strength of the fuselage, by supplying a substantially constant volume of air flow under pressure, and controlling the internal pressure in the cabin by controlling the outflow or venting of exhaust air therefrom. To this end I provide an improved remote control for the outflow valve embodying both an absolute pressure sensitive mechanism and a co-operating change of pressure rate sensitive mechanism, including means for preselecting the desired rate of pressure change. By including a remote control for the volume of air supplied to the cabin, and a warning system to indicate failure of the cabin pressure to follow the remote control, a central control panel for all the variables will enable the pilot or flight engineer to make a simulated altitude flight while on the ground and thus check the functioning of all controls before taking off.

It is also an object of this invention to provide a pressure cabin control of the type described wherein a limiting pressure differential between the cabin and the atmosphere is superimposed upon the adjustable controls to prevent excessive cabin pressures under abnormal or extremely high altitude conditions.

It is a further object of this invention to provide a pressure cabin control system of the class described wherein the pressure altitude and rate of change therein can be preselected to attain ground level pressure conditions within the cabin by the time the airplane reaches an airport, so that a rapid descent from a high altitude may be made with the assurance that no pressure differential remains in the cabin at the time passengers are due to leave the same.

It is also an important object of this invention to provide an improved and simplified outlet valve controlled by a servo-vacuum system embodying a motor mechanism arranged to follow the movements of a delicately balanced control member movable in response to variations in the degree of vacuum imposed thereon, but performing no part of the work involved in moving the outlet valve. This arrangement provides a more sensitive control that is not subject to hunting.

Other and further important objects of this invention will be apparent from the disclosures in the specification and the accompanying drawings.

The control arrangements have been indicated diagrammatically in the accompanying drawings in order to avoid confusing the disclosure with a multitude of unnecessary details of the instruments.

In the drawings:

Figure I is a diagrammatic showing of an embodiment of this invention as applied to the control of airplane cabin supercharging for high altitude flights.

Figures II and III disclose steps in the positioning of the vertical speed control mechanism shown in another position in Figure I.

Figure IV is a side elevation of the outflow valve, partly broken away to show a check valve on the air supply line to the cabin.

Figure V is an enlarged fragmentary vertical section on the line V—V of Figure IV, showing the follow-up operating mechanism for the outlet valve.

As shown in the drawings:

A remote control adjustment panel 10 is mounted in a position convenient to the flight engineer or other operator, and includes an adjustable altitude control knob 11 movable over a scale 12 indicating the desired altitude or barometric pressure conditions within the cabin. A second adjustable pressure rate change knob 13 moves over a scale 14 indicating the permitted rate of pressure change, or vertical speed in feet of altitude per minute, the infinity mark corresponding to no restriction on the rate of change. A third adjustable preselector knob 15 moves over a scale 16 indicating the impending conditions to be anticipated. A fourth adjustable knob 17 cooperates with a scale 18 indicating the desired volume of delivery of the supercharger. Each knob and its corresponding scale is so arranged that for normal operating conditions each knob points inwardly to a common center. A warning light 19 occupies this center position, the warning light responding to the apparent altitude or pressure within the cabin, as will be more fully described hereinafter.

The altitude control operated by the knob 11 is shown diagrammatically as comprising an evacuated altimeter bellows 20, one end of which operates a balanced beam valve 21, and the other end of which is adjustably supported by a cam 22 operated by the knob 11, the cam being so profiled as to adjust the bellows 20 for altitude pressure conditions ranging from sea level upward to provide both for a desired pressure altitude condition in the cabin, and to adjust the same in anticipation of the reported barometric pressure at the landing field, so that no excess pressure may exist within the cabin when the airplane lands. A vacuum connection 23 from a reducing valve, indicated generally by the numeral 24, leads to the beam valve chamber 25, which has an orifice 26 controlled by the beam valve which orifice connects at 27 to a preselector valve 28, operated by the knob 15, where it is placed in communication with a passage 29 under the stable or level flight setting of the preselector knob. The passage 29 leads to a piston controlled port 30 and thence through a connection 31 to a cabin outflow valve control motor 32 which adjusts the discharge of air from the cabin through a valve 33 to thus control the pressure therein. Once the adjustment knob 11 is set for an indicated value of either barometric pressure or pressure altitude, the cabin pressure, commencing at the altitude indicated, will not change appreciably during further increase in altitude until the cabin differential pressure limit is reached.

The outflow valve is shown in detail in Figures IV and V, where a valve body 34 provides a venturi like outlet passage 35 through the skin 36 of the ship, the incoming supply of warm pressure air being led around the outlet passage 35 in a conduit 37, to prevent icing of the valve 33 because of the pressure drop therethrough. The conduit 37 is supplied by air heated by compression in a supercharger or blower 38, as shown in Figure I, and has a freely hinged check valve 39 near its outlet, to prevent backflow of air should the supercharger not be running. An emergency manual holddown, comprising a flap 40, link 41, bellcrank 42 and a pull cable 43, permits the operator to hold the check valve 39 closed in an emergency.

The valve 33 is preferably carried by a spirally fluted stem 44 journaled in the bottom of the housing 45 to avoid sticking of the motor piston 32. The piston chamber 46, below the piston 32, is vented to the cabin through a chamber 47 having a screen 48 therein, the upper side of the piston being exposed to the vacuum through the line 31 when a control piston 49 and its stem 50 move away therefrom to uncover a central passage 51 in the stem, which communicates with the vacuum connection 31 opening into a control chamber 52.

The stem 50 has a circular channel 53 near the upper end thereof which registers with a cross-passage 54 when both the piston 32 and the stem 50 are fully bottomed, i. e., when the outlet valve 33 is fully seated. This would occur only if the cabin leakage were excessive. Under these conditions the right hand end of passage 54 communicates with a connection 57 to the line 83 thus bleeding air into the line 83. This produces a corrective increase of supercharged air supply to the cabin. A pressure reducing valve 55 having an atmosphere connection 56 is set for the maximum pressure differential permitted by the structural design of the cabin.

The stem 50 carries the control piston 49 in a control cylinder 58, the piston being backed by springs 59 which oppose or balance the vacuum from the line 31 which acts on the upper side of the piston 49. The lower part of the cylinder is vented to the cabin by a port 60 to the screen chamber 47.

A pull-rod 61 provides for emergency manual closure of the outlet valve 33, acting on the end of the stem 50 by means of a bell crank 62.

Control process vacuum is limited relative to cabin pressure by the reducing valve 24 which has a spring opposed piston 63 exposed to the cabin pressure, which piston controls a vacuum connection 64 from a vacuum pump 65, as well as a suction line 66 to the throat or inlet of the power driven cabin supercharger 38, the piston serving to limit or stabilize the vacuum in a chamber 68 having various connections, including the line 23 to the beam chamber 25. It will be evident that the piston spring, of low spring rate, will enable the valve 24 to shut off the vacuum connections 64 and 66 as required, to avoid necessity for the sensitive control devices associated with the cabin pressure control to seek new points of equilibrium as a result of any variation in degree of vacuum in the lines 64 and 66.

The pressure rate control comprises a series of graduated orifices 69 selectively or sequentially uncovered by the control knob 13, which orifices control the rate of leakage or inflow of air to a bellows 70 operating a second balanced beam valve 71. The bellows 70 are in communication with an air capacity tank 72, excess pressure or vacuum in which leaks off through the orifices 69 into the pressure cabin to limit the rate at which the bellows may expand or collapse respectively. By a proper selection of tank capacity and orifice area the various selected rates of pressure change may be obtained. It will be evident that this control is equally effective for either ascent, i. e., a reduction of cabin pressure accompanied by outflow from the tank 72, or for descent, an increase in cabin pressure accompanied by inflow to the tank 72.

The second beam valve 71 controls the operation of a piston 73 controlling the port 30, thus providing a pressure controlled relay operating in series with the pressure altitude control previously described.

Whenever the bellows 70 are in neutral position by virtue of neither negative nor positive pressure acting upon it, the beam valve 71 remains equalized between the cabin pressure ports 74', accordingly a comparatively loosely fitted motor piston 75 is exposed on both upper and lower sides to the open ports 74. However, a suction port 76 exerts a force on the upper side of the piston 75, drawing the piston 75 upward as far as the port 76 but appreciably no further since the piston 75 then seals off the port 76 to such an extent that, due to inflow leakage at the uppermost port 74, it can no longer raise itself against the downward force existing at the piston 73 caused by a plus pressure in the line 31 with respect to the pressure at a port 77 communicating with the chamber 68.

Now assuming a condition of rapidly falling cabin pressure to occur, the bellows 70 become expanded, raising the beam valve 71 to seal off the uppermost port 74. Then the inflow leakage thereat ceases, and the suction at the port 76 is capable of extending appreciably beyond the port 76. This results in the translation of the piston 73 to a point opposite the port 30, thereby closing port 30, and breaking the vacuum extended from the port 30 in such amount as will lower the outflow motor 32 to a position corresponding to a lesser rate of cabin outflow. This control approaches an equilibrium when the cabin pressure rate change reaches the setting of the knob 13.

During the existence of the opposite condition, a rapidly rising cabin pressure, the contraction of the bellows 70 causes the beam valve 71 to seal off the lowermost port 74. This allows vacuum from the port 76 to act, past the leaky sides of the piston 75, on the lower side thereof. In addition, the plus pressure at the line 31 with respect to the pressure at the port 77 lowers the piston 75 and the piston 73. A communication is thus established between the line 31 and the port 77, allowing the vacuum in the port 77 to lift the outflow motor parts to a position corresponding to a greater rate of cabin outflow.

The preselector control knob 15 operates the compound valve 28 to shut off the flow through the pressure altitude control, or to by-pass vacuum around the pressure altitude control, as the case may be. If the preselector valve 28 is set on "Descent" the vacuum line 27 is closed, allowing the outflow valve 33 to close and thus build up pressure in the cabin. However, a vacuum by-passing action of the pressure rate control relay to the line 31 prevents the cabin pressure from rising at a higher rate than the rate control is set for. On the other hand, if the preselector valve is set for "Ascent" the valve 28 connects the controlled vacuum chamber 68 through line 78 to the pressure rate relay port 30 so that if there is positive pressure in the cabin it will be reduced at a rate corresponding to that set by the pressure rate control, due to throttling action in the relay. For level flight or normal conditions the valve 28 connects the vacuum line 27 of the pressure altitude control directly to the relay port 30 through the line 29 thus by-passing the preselector control.

The warning light 19 at the center of the panel comprises a miniature light bulb mounted in a piston 79 normally held out of electrical contact, against the pressure of a spring 80, by a vacuum connection 81 to the pressure altitude beam valve chamber 25. If for any reason the cabin pressure falls below the setting of the pressure altitude mechanism, the resulting over-travel of the beam valve 21 cuts off the connection 81, allowing the spring 80 to push the light bulb piston 79 into electrical contact, lighting the warning light.

The supercharger load control or volume knob 17, controls a variable orifice valve 82 constituting an air-bleed connection 83 to a flow measuring venturi 84 at the discharge of the supercharger 36. This venturi forms part of a control system at the supercharger inlet, comprising a follow-up piston 85 operating a damper 86 in the inlet, the piston being controlled by a follow-up mechanism similar to that of the outlet valve 33, being balanced between a connection 87 to the venturi 84 that tends to close the damper 86 and a connection 88 to the supercharger discharge which acts as a reference pressure source for the venturi 84.

The illustrated control system is intended to control supercharger and outflow valves installed in duplicate and operated in unison by the single control system. The variable orifice valve 82 operates in duplicate for each supercharger, as indicated by the second air-bleed line 91 for the second supercharger, and the second orifice valve 82A.

In describing the operation of the cabin controls of this invention, assume that the maximum desired differential corresponds to the difference between atmospheric pressure at 8,000 feet and at 20,000 feet altitude, or approximately 4 pounds to the square inch.

There are several ways in which the pressure cabin control adjustments can be set to effect different automatic operations during flight. The simplest mode of operation consists in having the pressure rate control set to infinity and the preselector set to "level." Then the altitude control will govern. Assuming that the pressure altitude control is set to 8,000 ft., then as the aircraft ascends up to 8,000 feet the cabin pressure will at all times be equal to the outside atmospheric value. This is because the orifice 26 of the altitude control remains fully open until an 8,000 foot pressure altitude is reached, and also because the largest or infinity bleed orifice 69 of the rate control 13 produces no restriction on the bellows 70. Accordingly the servo-vacuum through line 31 maintains the outflow valve 33 fully open to the atmosphere. Upon the attainment of 8,000 feet as the aircraft continues to ascend, the cabin pressure will no longer follow the atmospheric pressure but will remain constant until an altitude of approximately 20,000 feet is reached. This is because the beam valve 21 is urged by the bellows 20 to progressively cut off orifice 26, which reduces the servo-vacuum through the line 31 effective above the pistons 32 and 49, resulting in a lowering or restriction of the outflow valve 33. If there is further ascent beyond 20,000 feet the cabin pressure will always exist at 4.1 pounds per square inch greater than the outside atmospheric pressure, because atmospheric pressure, which is then negative with respect to the cabin, is transmitted along line 56 and raises the valve 55 at the predetermined maximum pressure differential, increasing the vacuum acting on pistons 49 and 32, thus tending to open the outlet valve 33.

Let us now assume that the rate of pressure change control is set to a value of 200 feet per minute instead of infinity and the previous flight repeated at an actual speed of ascent greater than 200 feet per minute. Then the pressure rate control will act through a restricted orifice 69 of the rate setting valve 13 to restrict the escape of air through the bellows 70 from the capacity tank 72, thus maintaining an excess pressure in the bellows. It should be noted that during a climb, air flows out of the tank 72 to provide excess pressure in the bellows 70, while during descent air flows back into the tank 72 as cabin pressure increases, producing a negative pressure in the bellows if a restricted orifice 69 is in use. The surplus or excess pressure in the bellows 70 will cause pressure in the cabin with respect to the atmosphere to become positive immediately during ascent and accordingly when the aircraft reaches 8,000 feet altitude there will be a considerable positive pressure in the cabin, but upon further increase of altitude up to 20,000 feet the cabin pressure will no longer change because the "altitude" control will then take over, as a result of the progressive expansion of the bellows 20 which restricts the orifice 26. During ascent beyond 20,000 feet the pressure rate control will be overcome by the differential pressure limit control of 4.1 pounds per square inch above atmospheric pressure for the protection of the cabin. During descent, from any altitude greater than 20,000 feet down to 20,000 feet the cabin pressure will fall below 4.1 pounds per square inch if necessary, in order that the 200 feet per minute rate control may not be exceeded. If during this descent the aircraft is continued down to 15,000 feet for example, and held there, the pressure will stabilize out at the rate of 200 feet per minute to the setting of 8,000 feet altitude. If the aircraft is caused to subsequently descend further at any rate of speed, the cabin pressure will not change until 8,000 feet elevation has been reached. Below 8,000 feet the cabin pressure can always be maintained the same as outside atmospheric pressure by the use of an auxiliary inlet relief valve to the cabin to prevent a negative differential pressure from acting upon the cabin.

It is evident that the latter descent from 8,000 feet may be uncomfortable to the passengers if the aircraft descent rate is maintained high, as is advantageous from the standpoint of quick schedules, and particularly if the aircraft is approaching a landing field beyond high mountains.

The preselector knob may be set to "Descent" but then the only assurance that the aircraft will have zero differential pressure when the passengers are supposed to leave the aircraft rests on the flight engineer correctly adjusting the knob.

However, when the field barometric pressure is received by radio, the flight engineer can set the altitude adjustment knob to the exact barometric pressure of the landing field before the descent is started. The cabin pressure then immediately starts to increase but cannot exceed 4.1 pounds per square inch above atmospheric pressure and yet there is no danger of the aircraft landing with a plus pressure in the cabin as might otherwise be the case.

The altitude warning light is located in the center of the symmetrical instrument panel. The pointers of all knobs are directed at the warning light during average flight operations. The warning light consists of a piston-borne miniature light bulb normally held out of electrical contact against spring pressure by the control line vacuum at the discharge of the instrument reducing valve. If for any reason the cabin pressure falls below the setting of the altitude control knob, the resultant over-travel of the altitude control beam valve breaks the vacuum supporting the piston and the light becomes energized. In this manner duplication of expensive aneroid elements is avoided as well as attendant problems in obtaining calibration between two separate aneroids.

The supercharger load control adjustment on the panel, constituting an air-bleed line into the supercharger flow-measuring venturi of the supercharger flow controls, is employed as an emergency inflow increasing device in the event of serious leakage in the cabin. Furthermore, the flow into the cabin can be conveniently adjusted to suit weather conditions. In extremely cold weather the superchargers can be overloaded to provide a greater quantity of warm compressed air. During unusually hot weather the inflow may be best decreased so that the refrigeration load of the cabin air recirculation system will not be too severe.

It will thus be seen that I have invented an improved cabin-pressure control system for maintaining positive and adjustable pressure conditions within the cabin of an airplane during high altitude flights.

Having thus described my invention and the present preferred embodiments thereof, I desire to emphasize the fact that many modifications may be resorted to in a manner limited only by a just interpretation of the following claims.

I claim:

1. A cabin pressure control adapted to provide an adjustable positive pressure therein, comprising a supply of air under pressure, an outlet valve operable to control the pressure built up by said supply of air, a servo-vacuum system for operating said outlet valve, and pressure rate sensitive and altitude sensitive valves in series in said servo-vacuum system for varying the same to control said outlet valve and means for adjusting the altitude sensitive valve to produce a change in the altitude setting of the outflow valve that will be approached at the rate corresponding to the pressure rate sensitive valve.

2. A cabin pressure control adapted to provide an adjustable positive pressure therein, comprising a supply of air under pressure, an outlet valve operable to control the pressure built up by said supply of air, a servo-vacuum system for operating said outlet valve, a vacuum reducing valve in said system responsive to cabin pressure to produce a constant vacuum differential in said system, pressure rate sensitive and altitude sensitive valves in series in said servo-vacuum system for varying the same to control said outlet valve and means for adjusting the altitude sensitive valve to produce a change in the altitude setting of the outflow valve that will be approached at the rate corresponding to the pressure rate sensitive valve.

3. A cabin pressure control adapted to provide an adjustable positive pressure therein, comprising a supply of air under pressure, an outlet valve operable to control the pressure built up by said supply of air, a servo-vacuum system for operating said outlet valve, an alarm actuating mechanism in said system normally held inoperative by the vacuum therein, and pressure rate sensitive and altitude sensitive valves in series in said servo-vacuum system for varying the same to control said outlet valve and means for adjusting the altitude sensitive valve to produce a change in the altitude setting of the outflow valve that will be approached at the rate corresponding to the pressure rate sensitive valve.

4. A cabin pressure control adapted to provide an adjustable positive pressure therein, comprising a supply of air under pressure, an outlet valve operable to control the pressure built up by said supply of air, a servo-vacuum system for operating said outlet valve, an alarm actuating mechanism in said system normally held inoperative by the vacuum therein, a vacuum reducing valve in said system responsive to cabin pressure to produce a constant vacuum differential in said system, and pressure rate sensitive and altitude sensitive valves in series in said servo-vacuum system for varying the same to control said outlet valve.

5. A cabin pressure control adapted to provide an adjustable positive pressure therein, comprising a supply of air under pressure, an outlet valve operable to control the pressure built up by said supply of air, a servo-vacuum system for operating said outlet valve, an alarm actuating mechanism in said system normally held inoperative by the vacuum therein, a vacuum reducing valve in said system responsive to cabin pressure to produce a constant vacuum differential in said system, pressure rate sensitive and altitude sensitive valves in series in said servo-vacuum system for varying the same to control said outlet valve and means for adjusting the altitude sensitive valve to produce a change in the altitude setting of the outflow valve that will be approached at the rate corresponding to the pressure rate sensitive valve.

6. In a cabin supercharging system a source of air under pressure and means for controlling the cabin pressure comprising an outlet valve, a fluid motor for operating said outlet valve in response to variation in the differential pressure between the cabin and the atmosphere, a control means for said motor comprising a piston spring loaded on one side and exposed to cabin pressure on the other side, the piston being moved against the action of the spring by a fluid connection thereto, and a passageway controlled by said piston connecting said fluid connection to said fluid motor when said piston moves relative to said fluid motor whereby to cause the motor to follow the movement of said piston.

7. In a cabin supercharging system a source of air under pressure and means for controlling the cabin pressure comprising an outlet valve, a fluid motor for operating said outlet valve in response to variations in the differential pressure between the cabin and the atmosphere, a control means for said motor comprising a piston spring loaded on one side and exposed to cabin pressure on the other side, the piston being moved against the action of the spring by a fluid connection thereto, a passageway controlled by said piston connecting said fluid connection to said fluid motor when said piston moves relative to said fluid motor whereby to cause the motor to follow the movement of said piston and a pressure reducing valve connected between the atmosphere outside the cabin and the piston to limit the maximum pressure differential to which the outflow valve can be adjusted by the controls acting on said piston.

8. A supercharged cabin pressure control system of the class described, including means supplying air to the cabin and means for controlling the pressure in said cabin, comprising an adjustable cabin outlet valve, means responsive to altitude pressure for controlling said outlet valve, means in series with said last mentioned means for varying the rate of pressure change within said cabin, and means for adjusting the response of said altitude pressure means whereby to produce a change in the pressure altitude within the cabin at a rate determined by the rate of pressure change means.

9. A supercharged cabin pressure control system of the class described, including means supplying air to the cabin and means for controlling the pressure in said cabin, comprising an adjustable cabin outlet valve, means responsive to altitude pressure for controlling said outlet valve, means in series with said last mentioned means for varying the rate of pressure change within said cabin, means for adjusting the response of said altitude pressure means whereby to produce a change in the pressure altitude within the cabin at a rate determined by the rate of pressure change and means associated with said rate of pressure change means for preselecting either an increase or decrease in the pressure change.

10. A supercharged cabin pressure control system of the class described, including means supplying air to the cabin and means for controlling the pressure in said cabin, comprising an adjustable cabin outlet valve, means responsive to altitude pressure for controlling said outlet valve, means in series with said last mentioned means for varying the rate of pressure change within said cabin, means for adjusting the response of said altitude pressure means whereby to produce a change in the pressure altitude within the cabin at a rate determined by the rate of pressure change, means associated with said rate of pressure change means for preselecting either an increase or decrease in the pressure change and warning means associated with said last mentioned means adapted to indicate a failure of the cabin pressure to follow the adjustment of said means.

11. A differential pressure control system for maintaining adjustable positive pressures in a closed compartment, comprising a source of air supply to said compartment, an outflow valve for venting said compartment, operating means for said outflow valve comprising a spring loaded piston movable in response to vacuum acting on one side thereon, a follow-up piston, a vacuum connection therefor controlled by said spring loaded piston, said follow-up piston being adapted to actuate said outflow valve, a source of vacuum for operating said follow-up piston, and means for varying the degree of vacuum comprising pressure rate sensitive and altitude sensitive elements.

12. A differential pressure control system for maintaining adjustable positive pressures in a closed compartment, comprising a source of air supply to said compartment, an outflow valve for venting said compartment, operating means for said outflow valve comprising a spring loaded piston balanced between a connection to the atmosphere and a source of vacuum for operating the same, a follow-up piston, a vacuum connection therefor controlled by said spring loaded piston, said follow-up piston being adapted to actuate said outflow valve, a source of vacuum for operating said follow-up piston, and means for varying the degree of vacuum comprising pressure rate sensitive and altitude sensitive elements.

13. In a control system of the class described, vacuum operated instruments for varying the pressure, rate of change, and direction of change of pressure in a closed compartment, and modulating means for a source of vacuum for operating said instruments, comprising a piston balanced between a spring load in one direction and the cabin pressure in the other direction whereby to render the instruments unaffected by changes in the degree of vacuum from said source.

14. In a control system of the class described, vacuum operated instruments for varying the pressure, rate of change, and direction of change of pressure in a closed compartment, and modulating means for a source of vacuum for operating said instruments, comprising a piston balanced between a spring load in one direction and the cabin pressure in the other direction whereby to render the instruments unaffected by changes in the degree of vacuum from said source, and warning means associated with said vacuum operated instruments and responsive to both the cabin pressure and the controlling instruments, whereby to indicate a failure of the cabin pressure to follow the instrument control.

15. In a control system adapted to maintain a positive pressure differential variable relative to the external pressure on a closed compartment, a source supplying supercharging air to said compartment, vacuum operated simultaneously operable instruments for varying the differential pressure, rate of change in the differential pressure, a source of vacuum for operating said instruments, and vacuum stabilizing means comprising a spring opposed piston balanced against the cabin pressure and acting to throttle both the vacuum source and suction at the inlet to the source of supercharging air to modify the transmission of vacuum therefrom to said control instruments.

16. In a control system adapted to maintain a positive pressure differential variable relative to the external pressure on a closed compartment, a source supplying supercharging air to said compartment, vacuum operated simultaneously operable instruments for varying the differential pressure, rate of change in the differential pressure, and direction of change in the differential pressure, a source of vacuum for operating said instruments, and vacuum stabilizing means comprising a spring opposed piston balanced against the cabin pressure and acting to throttle both the vacuum source and suction at the inlet to the source of supercharging air to modify the transmission of vacuum therefrom to said control instruments, and warning means associated with said vacuum operated instruments and responsive to both the cabin pressure and the controlling instruments, whereby to indicate a failure of the cabin pressure to follow the instrumental control.

17. In a control system for a supercharged aircraft cabin having an air outlet: a movable valve controlling said air outlet, a source of substantially constant vacuum, vacuum controlled means for operating said valve, and means automatically responsive to variations in internal cabin pressure for governing application of vacuum from said source to said vacuum controlled means.

18. A cabin pressure control adapted to provide an adjustable positive pressure therein, comprising a supply of air under pressure, an outlet valve operable to control the pressure built up by said supply of air, a servo-vacuum system for operating said outlet valve, and pressure rate sensitive and altitude sensitive valves in said servo-vacuum system for varying the same to control said outlet valve and means for adjusting the altitude sensitive valve to produce a change in the altitude setting of the outflow valve that will be approached at the rate corresponding to the pressure rate sensitive valve.

19. In a control system for a supercharged aircraft cabin having an air outlet: a movable valve controlling said air outlet, a source of vacuum, vacuum controlled means for operating said valve, and means exposed to internal cabin pressure non-responsive to fall of cabin pressure to a predetermined pressure level but responsive to cabin pressure at and below said level to govern application of vacuum from said source to said vacuum controlled means in a manner to maintain the cabin pressure substantially constant at said level.

20. In a control system for a supercharged aircraft cabin having an air outlet: a movable valve controlling said outlet, a vacuum supply line, vacuum controlled means connected to said line adapted to operate said valve, a vacuum control valve in said vacuum supply line, an aneroid the expansion of which is adapted for urging said vacuum control valve to move in a direction to effect operation of said vacuum controlled means causing closing movement of said air outlet valve, said aneroid device being exposed to internal cabin pressure, and being ineffective to cause movement of said vacuum control valve in response to fall of cabin pressure until a predetermined pressure level is reached, but being responsive at and below said predetermined pressure to support said vacuum control valve at positions in which the air outlet valve maintains the internal cabin pressure approximately constant at said predetermined level.

21. In a control system for a supercharged aircraft cabin having an air outlet: a movable valve controlling said outlet, a vacuum supply line, vacuum controlled means connected to said line adapted to operate said valve, a vacuum control valve in said vacuum supply line, a resilient evacuated chamber for urging said vacuum control valve to move in a direction to effect operation of said vacuum controlled means causing closing movement of said air outlet valve, said evacuated chamber being exposed to cabin interior pressure and having a movable wall operatively coupled to said vacuum control valve so as to act thereon in opposition to the resiliency of said chamber.

22. In a control system for a supercharged aircraft cabin having an air outlet: a movable valve controlling said air outlet, a spring constantly urging said valve toward closed position, vacuum controlled means for moving said valve against said spring, a source of substantially constant vacuum, and means responsive to internal cabin pressure for governing application of vacuum from said source to said vacuum controlled means.

23. In a control system for a supercharged aircraft cabin having an air outlet: a movable valve controlling said air outlet, a spring constantly urging said valve toward closed position, a vacuum chamber, a flexible diaphragm closing one side of said vacuum chamber, an operative connection between said diaphragm and said valve adapted to cause said valve to move toward open position against the opposition of said spring in accordance with inward movement of said diaphragm, a vacuum source, and means affected by internal cabin pressure for controlling the application of vacuum from said source to said vacuum chamber.

24. In a control system for a supercharged aircraft cabin having an air outlet: a movable valve controlling said air outlet, a source of substantially constant vacuum, vacuum controlled means for operative said valve, and means responsive to the pressure externally of the cabin for overriding the application of vacuum from said source of constant vacuum to said vacuum controlled means.

25. In a control system for a supercharged aircraft cabin having an air outlet discharging to atmosphere from said cabin, a vacuum controllable valve controlling said air outlet, a source of substantially constant vacuum, means including a vacuum control valve for applying vacuum from said source to said vacuum controllable valve, and means responsive to interior cabin pressure for controlling said vacuum control valve.

26. In a control system for a supercharged aircraft cabin having an air outlet: a vacuum controllable valve controlling said air outlet and adapted to open said air outlet to a degree dependent upon the vacuum applied thereto, a source of vacuum, vacuum connections and controls including a control valve between said source of vacuum and said vacuum controllable valve, and means responsive to absolute pressure within the cabin for governing said control valve in a manner to vary the vacuum applied to the vacuum controllable valve so as to vary the air outlet opening to maintain the pressure in the cabin substantially constant.

27. In a control system for a supercharged aircraft cabin having an air outlet: a pneumatically operable valve controlling said air outlet, a pneumatic control line, a first control valve in said line, a second control valve connected to said pneumatic control line, absolute pressure responsive means exposed to cabin pressure controlling said first control valve, and pressure responsive means, exposed to the external atmospheric pressure, controlling said second control valve.

NATHAN C. PRICE.